3,281,338
METHOD FOR PRODUCING ULTRA HIGH PURITY PLUTONIUM METAL

Joseph A. Leary and Lawrence J. Mullins, Jr., Los Alamos, N. Mex., assignors to the United States of America as represented by the United States Atomic Energy Commission
No Drawing. Filed Apr. 20, 1966, Ser. No. 545,213
10 Claims. (Cl. 204—1.5)

The invention described herein was made in the course of, or under, a contract with the U.S. Atomic Energy Commission.

This invention relates to a method and apparatus for making ultra high purity plutonium metal in an electrorefining process and specifically a method and apparatus for the elimination of impurities introduced by the cathode during the refining operation.

The cathode of an electrorefining process as appears in the application S.N. 464,250, and U.S. Patent No. 3,098,028, Mullins et al., introduces impurities into the refined plutonium product. These impurities are tungsten from the tungsten cathode, iron from the ceramic crucible, and americium from the radioactive decay of $Pu^{241}$ isotope. The inventors have found that the iron may be removed from the crucible by hydrochloric acid leaching while the americium contamination of the refined product can be held to a minimum by the suitable choice of plutonium metal feed and plutonium salt electrolyte. The removal of tungsten as an impurity presented a major problem and the solution of this problem is the subject of this invention.

The inventors have found that the integrity of the cathode can be improved by coating the cathode with a stable, interstitial conducting compound which is of the same class of materials as is in the cathode. Means of reducing the amount of refractory metal is to use a metallic compound that is more stable than the corresponding plutonium compound as a cathode. As shown in the following table the carbides of niobium, tantalum, zirconium, titanium, and hafnium and the nitrides of titanium and hafnium have greater heats of formation than the corresponding plutonium compound. Although the Gibbs standard free energies of formation are not known at the desired temperature of $\sim 1000°$ K., any of the compounds shown in the table would be suitable.

Table.—Standard heats of formation of selected carbides and nitrides

| | $-\Delta H°_{298}$, Kcal./mole |
|---|---|
| Carbide: | |
| PuC | $\sim 1.7$ |
| NbC | 33.6 |
| TaC | 38.5 |
| ZrC | 38.9 |
| TiC | 42.7 |
| HfC | 52.0 |
| Nitride: | |
| PuN | $\sim 70$ |
| TiN | 80.5 |
| HfN | 88.2 |

The inventors hereby incorporate by reference in this application U.S. application S.N. 464,250, entitled, "Method and Apparatus for Improving Recovery of Plutonium-Gallium Alloys," by Joseph A. Leary, Lawrence J. Mullins, Jr., and John F. Buchen, and assigned to the U.S. Atomic Energy Commission.

It is therefore an object of this invention to provide a method and an apparatus for producing ultra high purity plutonium metal in an electrorefining process.

It is further an object of this invention to provide a coated cathode, said cathode having a coating of any stable to plutonium interstitial conducting compound which is of the same class of metals as is the cathode.

Further objects of this invention will become apparent from the following description of a preferred embodiment of this invention.

A tantalum cathode is coated with a tantalum carbide coating using any well known method to accomplish the coating of the cathode. For example, the tantalum cathode is carburized by heating in a hydrogen atmosphere to $\sim 1700°$ C. in the presence of carbon. The coating is approximately 17 microns thick. The exterior phase was TaC ($\sim 12$ microns); the phase adjacent to the tantalum substrate is probably $Ta_2C$.

Specific results from the coating of a tantalum cathode with tantalum carbide showed that the contamination of tungsten, tatalum, and carbon in the refined plutonium product was held to a nondetectable amount. After the electrorefining run, each plutonium product ring was sampled in the standard manner. A total of five runs was conducted. In the first four runs, TC-1 through TC-4, the same carburized cathode was reused to evaluate life expectancy of a coated cathode. New carburized cathodes were used in runs TC-5, TC-6, and TC-7. The electrolyte for runs TC-1 through TC-4 was 8.72 percent by weight $PuF_3$ in equimolar NaCl-KCl. For runs TC-5 through TC-7, the electrolyte was 8.28 percent by weight $PuCl_3$ in equimolar NaCl-KCl.

The chemical analysis of electrorefined product metal makes clear that carburized tantalum cathodes introduce less refractory metal into the plutonium metal than do tungsten cathodes. In runs TC-1 and TC-2 the plutonium contained $<35$ p.p.m. tantalum, $<2.5$ p.p.m. tungsten, and $<10$ p.p.m. carbon. During the course of this work, the lower limit of detectability for tantalum was lowered. The tantalum concentration was $<20$ in run TC-4, and the carbon concentration was 15 p.p.m. in run TC-3 and 25 p.p.m. in run TC-4. Thus reuse of the carburized cathode for more than two runs appears to be undesirable if high purity plutonium is desired. Although this is an undesirable feature for recycling many kilograms of plutonium metal scrap, it is not a serious drawback in preparing special multikilogram-scale lots of pure plutonium. The overall results indicate that plutonium with less than 50 p.p.m. metal impurities can be prepared routinely. With reasonable precaution and possibly with lot selection, all metal impurities can be reduced to limits of detectability except for the americium that grows in after refining.

The inventors have found that any stable to plutonium, interstitial electrically conducting material is suitable to provide the cathode with a coating, and in particular the carbides of titanium, zirconium, hafnium, niobium, and tantalum along with the nitrides and borides of titanium, hafnium, and niobium have been found to provide a proper coating material so as to preserve the integrity of the cathode during the electrorefining process.

The importance of having a method and apparatus to reduce the metallic impurities that are present in every electrorefining process is that the product is nearly 100 percent plutonium. The advantage of having pure plutonium metal is that it allows detailed and exact study of the physical and chemical properties of this metal. The use of plutonium metal is becoming more prevalent as a reactor fuel and it is therefore important to understand the physical and chemical properties of this metal so as to maximize the various applications in which this metal may be used.

The foregoing illustrations of the present invention are not intended to limit its scope which is to be limited entirely by the appended claims.

What is claimed is:

1. A method of reducing the refractory metal impurities in the electrorefining operation of plutonium metal, the impurities being introduced by the refractory metal cathode, comprising coating the cathode with at least one stable, electrically conducting compound, said compound being selected from the class consisting of the carbides, nitrides, and borides of tantalum, hafnium, and niobium.

2. The method of claim 1 in which the coating compound is tantalum carbide.

3. The method of claim 1 in which the coating compound is tantalum nitride.

4. The method of claim 1 in which the coating compound is tantalum boride.

5. The method of claim 1 in which the coating compound is hafnium carbide.

6. The method of claim 1 in which the coating compound is hafnium nitride.

7. The method of claim 1 in which the coating compound is hafnium boride.

8. The method of claim 1 in which the coating compound is niobium carbide.

9. The method of claim 1 in which the coating compound is niobium nitride.

10. The method of claim 1 in which the coating compound is niobium boride.

No references cited.

REUBEN EPSTEIN, *Primary Examiner*.